United States Patent [19]
Gilles

[11] 4,025,486
[45] May 24, 1977

[54] HYDROXYPHENYLALKYLENEYL ISOCYANURATE/PENTAERYTHRITOL PHOSPHITE COMBINATIONS AS ULTRAVIOLET LIGHT STABILIZERS FOR POLYOLEFINS

[75] Inventor: Jack Conrad Gilles, Shaker Heights, Ohio

[73] Assignee: The B. F. Goodrich Company, Akron, Ohio

[22] Filed: Sept. 29, 1975

[21] Appl. No.: 617,945

Related U.S. Application Data

[63] Continuation-in-part of Ser. No. 406,344, Oct. 15, 1973, Pat. No. 3,909,491.

[52] U.S. Cl. .................. 260/45.8 NT; 252/400 A; 252/403; 252/404; 252/405; 260/45.8 R; 260/936
[51] Int. Cl.² ...................... C08K 5/34; C08K 5/52
[58] Field of Search ............. 260/45.8 R, 45.8 NT, 260/936

[56] References Cited

UNITED STATES PATENTS

| 3,039,993 | 6/1962 | Friedman | 260/45.8 |
|---|---|---|---|
| 3,205,250 | 9/1965 | Hechenbleikner | 260/45.8 |
| 3,293,327 | 12/1966 | Hechenbleikner et al. | 260/936 |
| 3,429,837 | 2/1969 | Langrish et al. | 260/2.5 |
| 3,573,251 | 3/1971 | Megna et al. | 260/45.8 |
| 3,637,582 | 1/1972 | Gilles | 260/45.8 |
| 3,763,093 | 10/1973 | Kletecka | 260/45.8 |
| 3,862,053 | 1/1975 | Susi | 252/403 |
| 3,867,337 | 2/1975 | Brunetti | 260/45.8 |
| 3,897,388 | 7/1975 | Lyons | 260/45.8 |
| 3,922,249 | 11/1975 | Mills | 260/45.8 |

Primary Examiner—Melvin I. Marquis
Assistant Examiner—R. A. White
Attorney, Agent, or Firm—Alan A. Csontos

[57] ABSTRACT

Polyolefin polymers subject to degradation on exposure to ultraviolet light are efficiently stabilized using a combination of a hydroxyphenylalkyleneyl isocyanurate compound and a pentaerythritol phosphite compound. The stabilized compositions exhibit exceptional stability to UV light, better than that achieved using known combinations of phenolic and phosphorous-containing stabilizer compounds.

14 Claims, No Drawings

HYDROXYPHENYLALKYLENEYL ISOCYANURATE/PENTAERYTHRITOL PHOSPHITE COMBINATIONS AS ULTRAVIOLET LIGHT STABILIZERS FOR POLYOLEFINS

CROSS REFERENCE TO RELATED APPLICATION

This application is a Continuation-In-Part of application Ser. No. 406,344 filed on Oct. 15, 1973, now U.S. Pat. No. 3,909,491.

BACKGROUND OF THE INVENTION

Phenolic compounds, particularly hydroxyphenyl substituted isocyanurate compounds, are known to be stabilizers for organic materials (see U.S. Pat. Nos. 3,531,483 and 3,637,582). Phosphorous-containing compounds, particularly phosphites and pentaerythritol phosphates, are also known to be stabilizers for organic materials (see U.S. Pat. Nos. 2,847,443; 3,053,878; 3,205,250; 3,293,327; 3,310,609; and 3,737,485). Specific combinations of phenolic compounds and phosphorous-containing compounds are also disclosed in the art. Relevant art in this area is: U.S. Pat. Nos. 3,112,272; 3,115,466; 3,145,176; 3,294,736; 3,333,027; 3,462,375; 3,567,724; 3,652,561; 3,678,047; and 3,886,114; British Pat. Nos. 1,380,449 and 1,320,169.

SUMMARY OF THE INVENTION

Combinations of (1) a hydroxyphenylalkyleneyl isocyanurate of the formula

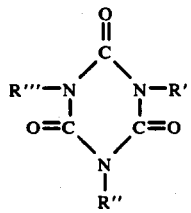

wherein R' is a hydroxyphenylalkyleneyl radical of the formula

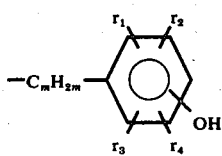

where $m$ is 1 to 4, $r_1$ is an alkyl radical having 1 to 18 carbon atoms and is positioned immediately adjacent to the hydroxyl group on the ring; $r_2$, $r_3$, and $r_4$ are hydrogen or an alkyl radical containing 1 to 18 carbon atoms; and R'' and R''' are hydrogen, an alkyl radical containing 1 to 18 carbon atoms, or are the same as R'; and (2) a pentaerylthritol phosphite compound selected from the group consisting of (a) compounds of the formula

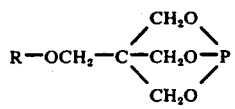

wherein R is an aliphatic radical containing 1 to about 20 carbon atoms, a cycloalkyl ring of 5 to about 8 atoms, or an aryl, alkaryl, or aralkyl group of 6 to about 14 carbon atoms, and (b) compounds of the formula

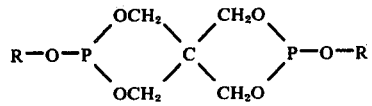

wherein R is defined as above, are useful as ultraviolet light stabilizers for polyolefin polymers. Stabilized compositions of polyolefin polymers containing the combination exhibit exceptional UV light stability.

DETAILED DESCRIPTION OF THE INVENTION

The combination of a hydroxyphenylalkyleneyl isocyanurate compound and a pentaerylthritol phosphite compound is an exceptionally good ultraviolet (UV) light stabilizer for polyolefin polymers. The hydroxyphenylalkyleneyl isocyanurate compound is used at a level from about 0.01 part to about 5 parts by weight, and more preferably at from about 0.05 part to about 3 parts by weight per 100 parts by weight of the organic material. The pentaerythritol phosphite compound is employed at similar levels, i.e., from about 0.01 part to 5 parts and preferably at about 0.05 part to about 3 parts by weight per 100 parts by weight of organic material. Thus, the combined weight of the compounds is from about 0.02 part to about 10 parts and more preferably from about 0.1 to 6 parts by weight per 100 parts by weight of organic material. The hydroxyphenylalkyleneyl isocyanurate can be used in from about a 10:1 to 1:10 weight ratio of isocyanurate compound to phosphite compound. Excellent results are obtained at about a 3:1 to 1:3 weight ratio. A 1:1 weight ratio of the compounds provides very effective stabilization of organic materials.

The hydroxyphenylalkyleneyl isocyanurate compounds have the formula

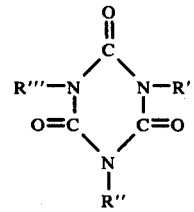

wherein R' is a hydroxyphenylalkyleneyl radical of the formula

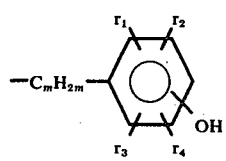

where $m$ is 1 to 4, $r_1$ is an alkyl radical having 1 to 18 carbon atoms and is positioned immediately adjacent to the hydroxy group on the ring; $r_2$, $r_3$, and $r_4$ are hydrogen or an alkyl radical containing 1 to 18 carbon atoms, and R'' and R''' are hydrogen, an alkyl radical containing 1 to 18 carbon atoms, or are the same as R'. A more preferred compound is when R'' and R''' are equal to R', i.e., all the R groups are hydroxyphenylalkyleneyl radicals, and $r_1$ is a t-alkyl radical containing from 4 to about 12 carbon atoms, $r_2$ is an alkyl radical containing 1 to about 12 carbon atoms, $r_3$ and $r_4$ are hydrogen, and $m = 1$.

Even more preferred are the symmetrical tris(3,5-di-tert-alkyl-4-hydroxybenzyl)isocyanurates of the formula

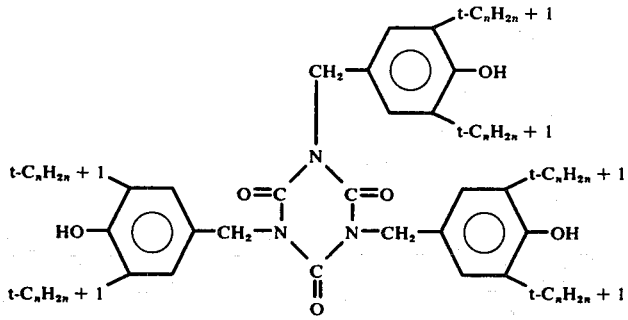

where $n$ is 4 to 8.

Examples of the 4-hydroxybenzyl isocyanurate compounds are: tris-(3-methyl-4-hydroxybenzyl)isocyanurate, tris-(3-t-butyl-4-hydroxybenzyl)isocyanurate, tris-(3-t-amyl-4-hydroxybenzyl)isocyanurate, tris-(3-cetyl-4-hydroxybenzyl)-isocyanurate, tris-(3,5-dimethyl-4-hydroxybenzyl)isocyanurate, tris-(3,5-diisopropyl-4-hydroxybenzyl)isocyanurate, tris-(3-methyl-5-isopropyl-4-hydroxybenzyl)isocyanurate, tris-(3-hexyl-4-hydroxybenzyl)isocyanurate, tris-(3,5-di-t-butyl-4-hydroxybenzyl)isocyanurate, tris-(3-t-butyl-5-t-amyl-4-hydroxy-benzyl)isocyanurate, tris-(3,5-di-t-amyl-4-hydroxybenzyl)-isocyanurate, tris-[3,5-di-(1-methyl-1-ethylpropyl)-4-hydroxy-benzyl]isocyanurate, tris-[3,5-di-(1,1,2,2-tetramethylpropyl)-4-hydroxybenzyl-]isocyanurate, tris-[3,5-di-(1-dimethylpentyl)-4-hydroxybenzyl]-isocyanurate, bis-(3-methyl-4-hydroxybenzyl)-isocyanurate, bis-(3-t-butyl-4-hydroxybenzyl-)isocyanurate, bis-(3,5-dimethyl-4-hydroxybenzyl-)isocyanurate, bis-(3,5-di-t-butyl-4-hydroxybenzyl)-isocyanurate, (3-methyl-4-hydroxy-benzyl)isocyanurate, (3-t-butyl-4-hydroxybenzyl)isocyanurate, (3,5-dimethyl-4-hydroxybenzyl)isocyanurate, (3,5-di-t-butyl-4-hydroxybenzyl)isocyanurate, and the like. Reference is is made to U.S. Pat. No. 3,531,483 which discloses isocyanurate compounds encompassed by this invention. The patent shows the preparation of these compounds and their utility as stabilizers, and is hereby incorporated by reference.

The pentaerythritol phosphite compounds employed in combination with the defined 4-hydroxyphenylalkyleneyl isocyanurates are selected from the group consisting of (a) compounds of the formula

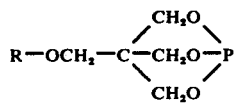

wherein R is an aliphatic radical containing 1 to about 20 carbon atoms, a cycloalkyl ring of 5 to about 8 carbon atoms, or an aryl, alkaryl, or aralkyl group of 6 to about 14 carbon atoms, and (b) compounds of the formula

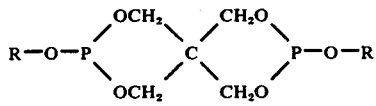

wherein R is defined as above. Illustrative of these compounds are those where when R is an aliphatic radical, R can be (a) an alkyl radical such as methyl, ethyl, isopropyl, n-butyl, n-hexyl, 2-ethylhexyl, n-dodecyl, n-tetradecyl, n-octadecyl, and the like, (b) an alkoxyalkyl radical of 2 to about 20 carbon atoms such as methoxyethyl, ethoxyethyl, ethoxypropyl, and the like, and (c) alkoxy carboalkyl radicals of 2 to about 20 carbon atoms such as methoxycarboethyl, propyloxycarboethyl, decyloxycarboethyl, and the like. When R is a cycloalkyl ring, illustrations of R include cyclopentyl, cyclohexyl, cyclooctyl, and the like. When R is an aryl group, phenyl and naphthyl are examples thereof. The aryl group can be halogenated as in a bromophenyl group. Lastly, when R is alkaryl of 7 to about 14 carbon atoms; i.e., an alkyl-substituted phenyl or naphthyl group, illustrations thereof are methylphenyl, t-butylphenyl, nonylphenyl, and the like; and when R is aralkyl of 7 to about 14 carbon atoms; i.e., an aryl-substituted alkyl group, benzyl and phenylethyl are examples thereof. The alkaryl or aralkyl group can be halogenated as in a 2-chloroethylphenyl group.

Examples of the defined pentaerythritol phosphites are dimethylpentaerythritol diphosphite, diethylpentaerythritol diphosphite, didodecylpentaerylthritol diphosphite, dioctadecylpentaerythritol diphosphite, diphenylpentaerylthritol diphosphite, ditolylpentaerythritol diphosphite, di-p-chlorophenylpentaerythritol diphosphite, dibenzylpentaerythritol diphosphite, and the like. U.S. Pat. Nos. 2,847,443; 2,961,454; 3,000,850; 3,205,250; and 3,737,485 disclose further examples of the defined compounds.

More preferably, the R groups are alkyl radicals of 1 to 20 carbon atoms, cyclohexyl, phenyl, or benzyl. Most preferably, R is a higher-alkyl group containing about 6 to about 20 carbon atoms such as n-hexyl, n-octyl, 2-ethylhexyl, n-decyl, n-tetradecyl, n-octadecyl, and the like.

The combinations of the isocyanurate compound and the phosphite compound as defined herein provides exceptional UV light stability to polyolefin polymers. Stabilized compositions containing the combination exhibit better stability than compositions containing known combinations of a phenolic stabilizer and a phosphorous-containing stabilizer. The combination is especially useful for the stabilization of α-monoolefin homopolymers and copolymers, wherein the α-monoolefin contains 2 to about 8 carbon atoms. High and low-density polyethylene, isotactic and atactic polypropylene, polyisobutylene, and poly(4-methyl-1-pentene) have excellent resistance to UV light when stabilized with the combinations of the present invention. Ethylene-propylene (EP) copolymers and ethylene-propylene (EPDM) terpolymers generally containing less than about 10% by weight of one or more monomers containing multiple unsaturation also are stabilized using the combination. Polymer blends of EP and EPDM polymers with polyolefins such as polyethylene and polypropylene are also stabilized.

Other organic materials which can be stabilized in accordance with the present invention include both natural and synthetic polymers. The combination is useful for the stabilization of cellulosic materials; natural rubber; halogenated rubber; conjugated diene polymers, as, for instance, polybutadiene, copolymers of butadiene with styrene, acrylonitrile, acrylic acid, alkyl acrylates or methacrylates, methyl vinyl ketone, vinyl pyridine, etc., polyisoprene, polychloroprene, and the like; vinyl polymers such as polyvinyl chloride, polyvinyl fluoride, polyvinylidene chloride, copolymers of vinyl chloride with vinylidene chloride, polyvinyl acetate, copolymers of vinyl halide with butadiene, styrene, vinyl esters, $\alpha,\beta$-unsaturated ketones and aldehydes, and the like; homopolymers and copolymers of acrylic monomers such as acrylic acid, methacrylic acid, methyl acrylate, methyl methacrylate, ethyl acrylate, 3-ethylhexyl acrylate, acrylamide, methacrylamide, N-methylolacrylamide, acrylonitrile, methacrylonitrile, and the like; polyether- or polyol-derived polyurethanes; acetal homopolymers and copolymers; polycarbonates; polyesters such as those derived from maleic, fumaric, itaconic, or terephthalic anhydrides, or the like; for example, polyethylene terephthalate; polyamides such as those derived from the reaction of hexamethylenediamine with adipic or sebacic acid; epoxy resins such as those obtained from the condensation of epichlorohydrin with bisphenols; and the like. Polymer blends, that is, physical admixture of two or more polymers may also be stabilized in accordance with the present invention.

In addition to polymeric materials, the present compounds act to stabilize a wide variety of other organic materials. Such compounds include: waxes, synthetic and petroleum-derived lubricating oils and greases; animal oils such as, for example, fat, tallow, lard, cod-liver oil, sperm oil; vegetable oils such as castor, linseed, peanut, palm, cotton seed, and the like; fuel oil; diesel oil, gasoline, and the like.

The compounds are readily incorporated into materials by dissolving or dispersing them within the materials. If the material is a solid, especially a polymeric solid such as a rubber or a plastic, the compounds can be admixed using Banburys, extruders, two-roll mills, and the like, following conventional techniques. A good way to disperse the compounds in plastic materials is to dissolve or suspend the compounds in a solvent such as acetone or benzene, mix the mixture with the plastic in powder form, and then evaporate off the solvent.

Compositions containing the novel combination of compounds can also contain many other known compounding ingredients such as fillers like carbon black, silica, metal carbonates, talc, asbestos, and the like; pigments and colorants; curative ingredients like sulfur and peroxides and vulcanization accelerators; fungicides and many more standard ingredients known to the art. As the combination is particularly useful as an ultra-violet light stabilizer, other ingredients known in the art as thermal and/or oxidative stabilizers can also be used in the UV light stabilized compositions.

The novel combination of a hydroxyphenylalkyleneyl isocyanurate compound and a pentaerythritol phosphite compound was evaluated as an ultraviolet light stabilizer for a polymeric $\alpha$-monoolefin homopolymer. Testing consisted of both UV and thermal/oxidative stability of prepared samples. In addition to the novel combinations of this invention, other phenolic compound/phosphorous-containing compound stabilizer combinations were evaluated. All samples were prepared by dissolving the stabilizer compounds in benzene, swelling polypropylene polymer in benzene, admixing the two mixes, and evaporating off the benzene. The stabilized composition is then extruded at 220° C. at 50 rpm, and test samples are molded from the extrudate at 220° C. to form strips 1 inch by 2 inches by 30 mils thick. These strip samples are employed in the oven aging and UV stability tests.

The UV stability of the compositions was evaluated as follows. Test samples prepared as described above are mounted on a 2 inch by 2 inch cardboard frame with a 1.5 inch by 0.75 inch hole cut from the center of the frame. These specimens are then placed in an Atlas Xenon Weatherometer Model No. 60-W equipped with a 6000 watt lamp. The exposure of the sample is maintained around the center of the apparatus. Temperature of the testing is ambient temperature, and a dry cycle is used. The specimens are examined periodically for embrittlement and for carbonyl formation in the polypropylene as determined by Infrared spectroscopy. Time to failure is determined to be the time to rapid carbonyl formation and embrittlement, which occur somewhat simultaneously in the polymer.

The thermal/oxidative stability (oven aging) testing consisted of aging the samples in an air-circulation oven at 140° C. until visual cracking of the sample was observed. At the first signs of crack development, the strip is bent slightly to see if it breaks (embrittlement). The time to the onset of cracking or embrittlement is measured. Samples are run in duplicate and the data averaged.

The following examples serve to more fully illustrate the combinations and compositions of this invention. The recipes are given in parts by weight unless otherwise specified.

EXAMPLE I

Compositions were prepared containing polypropylene, a hydroxyphenylalkyleneyl isocyanurate, and a pentaerythritol phosphite compound as defined in this invention. The sample compositions were tested for their UV light and oxidative stability. Recipes and data obtained are as follows:

|  | 1 | 2 | 3 | 4 | 5 | 6 | 7 | 8 | 9 | 10 | 11 |
|---|---|---|---|---|---|---|---|---|---|---|---|
| Polypropylene[1] | 100 | 100 | 100 | 100 | 100 | 100 | 100 | 100 | 100 | 100 | 100 |
| Isocyanurate[2] | — | 0.1 | 0.25 | 0.50 | — | 0.1 | 0.1 | 0.25 | 0.25 | 0.1 | 0.25 |
| Phosphite A[3] | — | — | — | — | 0.1 | 0.1 | 0.25 | 0.1 | 0.25 | — | — |
| Phosphite B[4] | — | — | — | — | — | — | — | — | — | 0.25 | 0.25 |
| Ratio of Isocyanurate | — | — | — | — | — | 1:1 | 1:2.5 | 2.5:1 | 1:1 | 1:2.5 | 1:1 |

-continued

| | 1 | 2 | 3 | 4 | 5 | 6 | 7 | 8 | 9 | 10 | 11 |
|---|---|---|---|---|---|---|---|---|---|---|---|
| o Phosphite Xenon Weather-O-Meter Aging Test, Hours | <96 | 560 | 640 | 690 | — | 700 | 770 | 990 | 930 | 810 | 940 |
| 140° C. Oven Aging Test, Hours | <24 | 140 | 250 | 710 | <10 | 1430 | 3010 | 3860 | 3500 | 1800 | 3740 |

General purpose resin (Profax 6501).
1,3,5-tris(3,5-di-t-butyl-4-hydroxybenzyl)isocyanurate.

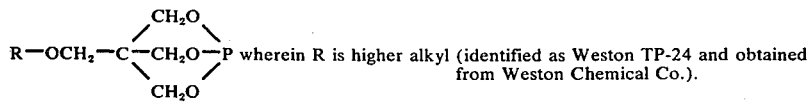 wherein R is higher alkyl (identified as Weston TP-24 and obtained from Weston Chemical Co.).

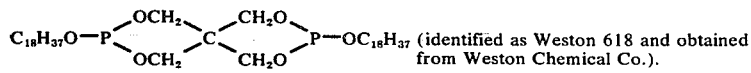 (identified as Weston 618 and obtained from Weston Chemical Co.).

Samples 6 to 11 are compositions of the invention. Samples 1 to 5 are control samples. The data shows that improved UV and thermal/oxidative stability is obtained using the specific combinations of the invention. Excellent UV stability is achieved at a level of from about 0.35 part to about 0.5 part by weight total of isocyanurate and phosphite compound per 100 parts by weight of polyolefin homopolymer.

EXAMPLE II

The ultraviolet light stability of compositions of the invention is better than that achieved using other known combinations of phenol and phosphorous-containing compounds. This is demonstrated in the following two series of tests.

In the first series, various phenols closely related to the defined isocyanurate compound are admixed into polypropylene at 0.1 part by weight per 100 parts by weight of polypropylene. Each sample additionally contains 0.25 part by weight of Phosphite A from Example I. The results reported in the following table show the significantly higher UV stability the composition of the invention exhibits (sample A-1 versus samples A-2 and A-5).

| Sample | Phenol Plus 0.25 Parts Phosphite A | Xenon Weather-O-Meter, Hours |
|---|---|---|
| A-1 | 1,3,5-tris(3,5-di-t-butyl-4-hydroxybenzyl)isocyanurate | 770 |
| A-2 | 2,4,6-tris(3,5-di-t-butyl-4-hydroxybenzylthio)triazine | 490 |
| A-3 | 2,2',2''-tris(3-(3,5-di-t-butyl-4-hydroxyphenyl)propionyloxy)ethylisocyanurate | 380 |
| A-4 | Bis(3,5-di-t-butyl-4-hydroxybenzyl)didodecyl malonate | 570 |
| A-5 | Tetrakis(methylene-3-(3',5'-di-t-butyl-4-hydroxyphenyl)propionate methane | 460 |

In the second series, various phosphorous-containing compounds are admixed into polypropylene at 0.25 part by weight per 100 parts by weight of polypropylene. Each sample additionally contains 0.25 part by weight of 1,3,5-tris(3,5-di-t-butyl-4-hydroxybenzyl)isocyanurate, an isocyanurate phenol of the invention. The results reported in the following table show that the compositions of the invention exhibit significantly higher UV stability (samples B-1 and B-2 versus samples B-3 to B-8).

| Sample | Phosphite Plus 0.25 Part of Isocyanurate Phenol | Xenon Weather-O-Meter, Hours |
|---|---|---|
| B-1 | Phosphite A[1] | 930 |
| B-2 | Phosphite B[2] | 940 |
| B-3 | Tris nonylphenyl phosphite | 690 |
| B-4 | Triphenyl phosphite | 570 |
| B-5 | Tris-p-methoxyphenyl phosphite | 390 |
| B-6 | Tris-p-tolyl phosphite | 490 |
| B-7 | Phosphite C[3] | 740 |
| B-8 | Phosphite D[4] | 190 |

[1]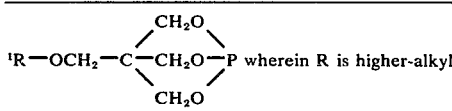 wherein R is higher-alkyl

[2]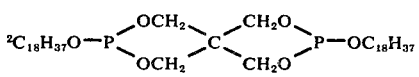

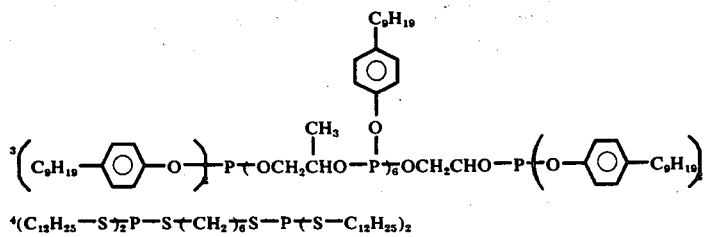

4 $(C_{12}H_{25}-S)_{\overline{2}}P-S(CH_2)_{\overline{6}}S-P(S-C_{12}H_{25})_2$ The exceptional UV stability achieved using the particular combination of the defined isocyanurate phenol compound and the defined pentaerylthritol phosphite compound is both unique and useful. The compositions of the invention exhibit an improved balance of UV stability along with oxidative/thermal stability not found using other combinations of phenols and phosphites.

I claim:

1. As a stabilizer for polyolefin polymers subject to degradation when exposed to ultraviolet light, a combination consisting essentially of (1) a hydroxyphenylalkyleneyl isocyanurate of the formula

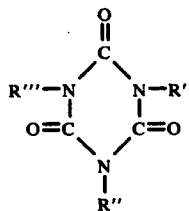

wherein R' is a hydroxyphenylalkyleneyl radical of the formula

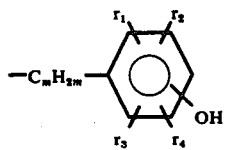

where $m$ is 1 to 4, $r_1$ is an alkyl radical having 1 to 18 carbon atoms and is positioned immediately adjacent to the hydroxyl group on the ring; $r_2$, $r_3$, and $r_4$, are hydrogen or an alkyl radical containing 1 to 18 carbon atoms; and R'' and R''' are hydrogen, an alkyl radical containing 1 to 18 carbon atoms, or are the same as R', and (2) a pentaerythritol phosphite compound selected from the group consisting of (a) compounds of the formula

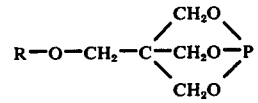

wherein R is selected from the group consisting of an aliphatic group containing 1 to about 20 carbon atoms, a cycloalkyl radical containing 5 to about 8 carbon atoms in the ring, and an aryl, alkaryl, or aralkyl group of 6 to about 14 carbon atoms in the group, (b) compounds of the formula

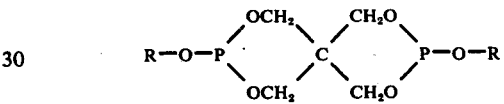

wherein R is defined as above, and wherein the said hydroxyphenylalkyleneyl isocyanurate compound is used in a weight ratio of about 10:1 to 1:10 to the pentaerythritol phosphite compound 2. A combination of claim 1 where in (1) R'' and R''' are equal to R', $r_1$ is a tertiary alkyl radical containing 4 to about 12 carbon atoms, $r_2$ is an alkyl radical containing 1 to about 12 carbon atoms, $r_3$ and $r_4$ are hydrogen, and $m = 1$.

3. A combination of claim 2 where (1) has the formula

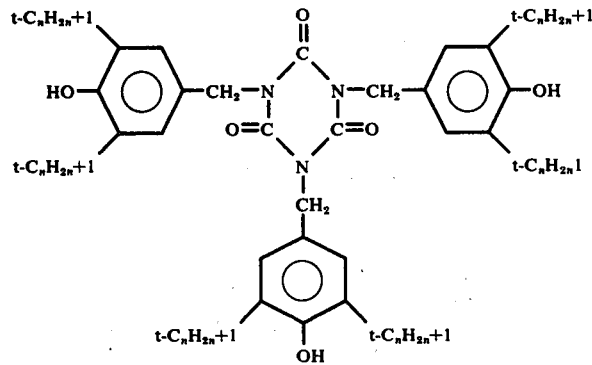

where $n$ is 4 to 8.

4. A combination of claim 3 where in (2) R is an alkyl radical of 1 to about 20 carbon atoms, cyclohexyl, phenyl, or a benzyl radical.

5. The combination of claim 4 where (1) is 1,3,5-tris-(3,5,-di-t-butyl-4-hydroxybenzyl)isocyanurate and (2) is

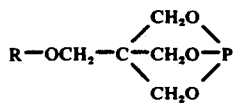

where R is alkyl of about 6 to about 20 atoms.

6. The combination of claim 4 where (1) is 1,3,5-tris-(3,5-di-t-butyl-4-hydroxybenzyl)isocyanurate and (2) is

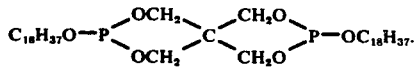

7. A composition comprising (A) a polyolefin polymer and (B) as the only ultraviolet light stabilizer, a combination of (1) a hydroxyphenylalkyleneyl isocyanurate of the formula

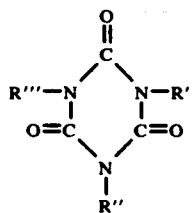

wherein R' is a hydroxyphenylalkyleneyl radical of the formula

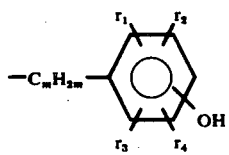

where $m$ is 1 to 4, $r_1$ is an alkyl radical having 1 to 18 carbon atoms and is positioned immediately adjacent to the hydroxyl group on the ring; $r_2$, $r_3$, and $r_4$ are hydrogen or an alkyl radical containing 1 to 18 carbon atoms; and R" and R''' are hydrogen, an alkyl radical containing 1 to 18 carbon atoms, or are the same as R', and (2) a pentaerythritol phosphite compound selected from the group consisting of (a) compounds of the formula

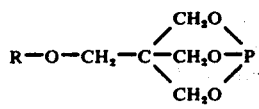

wherein R is selected from the group consisting of an aliphatic group containing 1 to about 20 carbon atoms, a cycloalkyl radical containing 5 to about 8 carbon atoms in the ring, and an aryl, alkaryl, or aralkyl group of 6 to about 14 carbon atoms in the group, (b) compounds of the formula

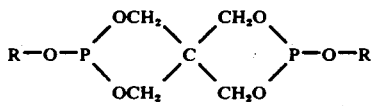

wherein R is defined as above, and wherein the said hydroxyphenylisocyanurate compound is used in a weight ratio of about 10:1 to 1:10 to the pentaerythritol phosphite compound.

8. A composition of claim 7 wherein (A) is a polyα-monoolefin polymer, and in (B)(1), R" and R''' are the same as R', $r_1$, is a tertiary alkyl radical containing 4 to about 12 carbon atoms, $r_2$ is an alkyl radical containing 1 to about 12 carbon atoms, $r_3$ and $r_4$ are hydrogen, and $m = 1$.

9. A composition of claim 8 wherein (A) is a polyα-monoolefin homopolymer and in (B)(2), R is an alkyl radical of 1 to about 20 carbon atoms, cyclohexyl, phenyl or benzyl radical.

10. A composition of claim 9 wherein (A) is a polypropylene.

11. A composition of claim 10 wherein (B)(1) has the formula

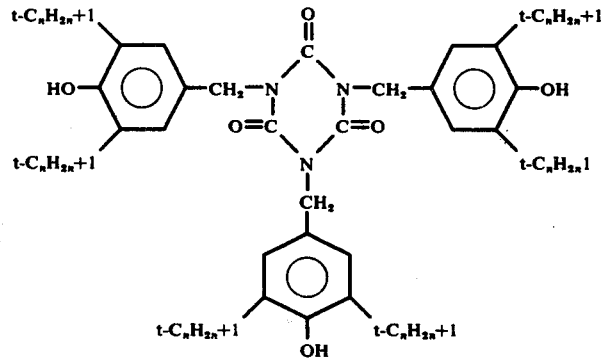

where $n$ is 4 to 8.

12. A composition of claim 11 wherein (B)(1) is 1,3,5-tris-(3,5-di-t-butyl-4-hydroxybenzyl)isocyanurate.

13. A composition of claim 12 wherein (B)(2) is the compound

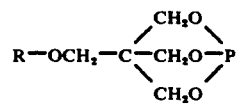

where R is alkyl of about 6 to about 20 atoms.

14. A composition of claim 12 wherein (B)(2) is the compound

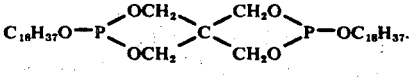

* * * * *

UNITED STATES PATENT OFFICE
CERTIFICATE OF CORRECTION

PATENT NO. : 4,025,486
DATED : May 24, 1977
INVENTOR(S) : Jack Conrad Gilles

It is certified that error appears in the above-identified patent and that said Letters Patent are hereby corrected as shown below:

Column 1, line 18, delete the word "phosphates", and add the word --phosphites--.

Column 8, line 25, delete the word "and", and add the word --to--; in the table at sample A-5, second line, place the parenthesis --)-- after the word propionate.

Signed and Sealed this

Third Day of January 1978

[SEAL]

Attest:

RUTH C. MASON
Attesting Officer

LUTRELLE F. PARKER
Acting Commissioner of Patents and Trademarks